US008095518B2

(12) United States Patent
Dubhashi et al.

(10) Patent No.: US 8,095,518 B2
(45) Date of Patent: Jan. 10, 2012

(54) TRANSLATING DRM SYSTEM REQUIREMENTS

(75) Inventors: Kedarnath A Dubhashi, Redmond, WA (US); Sumedh N Barde, Redmond, WA (US); Hany Farag, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/133,354

(22) Filed: Jun. 4, 2008

(65) Prior Publication Data

US 2009/0307254 A1      Dec. 10, 2009

(51) Int. Cl.
*G06F 17/30* (2006.01)
(52) U.S. Cl. .................. 707/695; 707/758; 713/158
(58) Field of Classification Search .......... 707/999.01, 707/999.009, 999.107, 999.203, 695, 758; 713/158
See application file for complete search history.

(56) References Cited

U.S. PATENT DOCUMENTS

| | | | |
|---|---|---|---|
| 6,330,670 B1 * | 12/2001 | England et al. ............ 713/2 |
| 6,772,340 B1 * | 8/2004 | Peinado et al. ............ 713/168 |
| 7,152,166 B2 * | 12/2006 | Strom et al. ............ 713/193 |
| 7,155,415 B2 * | 12/2006 | Russell et al. ............ 705/59 |
| 7,174,021 B2 * | 2/2007 | Krishnaswamy et al. ... 380/277 |
| 7,203,966 B2 * | 4/2007 | Abburi et al. ............ 726/29 |
| 7,210,039 B2 * | 4/2007 | Rodgers et al. ............ 713/182 |
| 7,222,232 B2 * | 5/2007 | Venkatesan et al. .......... 713/167 |
| 7,296,154 B2 | 11/2007 | Evans et al. |
| 7,437,771 B2 * | 10/2008 | Alkove et al. ............ 726/29 |
| 7,543,140 B2 * | 6/2009 | Dillaway et al. ............ 713/156 |
| 7,672,903 B2 * | 3/2010 | Lee et al. ............ 705/51 |
| 7,725,614 B2 * | 5/2010 | Jogand-Coulomb et al. ..... 710/8 |
| 7,774,280 B2 * | 8/2010 | Nguyen et al. ............ 705/59 |
| 2003/0078891 A1 | 4/2003 | Capitant |
| 2006/0080740 A1 | 4/2006 | Bremer et al. |
| 2006/0282391 A1 | 12/2006 | Peterka et al. |
| 2007/0100764 A1 | 5/2007 | Kim |
| 2007/0130076 A1 | 6/2007 | Park et al. |
| 2007/0255659 A1 | 11/2007 | Yen et al. |
| 2007/0283423 A1 | 12/2007 | Bradley et al. |
| 2008/0114692 A1 | 5/2008 | Jogand-Coulomb et al. |

FOREIGN PATENT DOCUMENTS

| | | |
|---|---|---|
| KR | 20060129581 | 12/2006 |
| WO | WO-2007042992 | 4/2007 |
| WO | WO2007102699 A1 | 9/2007 |
| WO | WO-2007102693 | 9/2007 |

OTHER PUBLICATIONS

Chong et al. License Transfer in OMA-DRM, 2006, pp. 81-96.*
Serrao et al., Interoperability Mechanisms for Registration and Authentication on Different Open DRM Platforms, Dec. 25, 2006, pp. 291-303.*
"PCT Search Report and Written Opinion", Application No. PCT/US2009/045670, (Jan. 11, 2010), 11 pages.
Geer, "Digital Rights Technology Sparks Interoperability Concerns", vol. 37, Issue 12, Dec. 2004, IEEE Computer Society, pp. 20-22.

(Continued)

*Primary Examiner* — Leslie Wong (57) ABSTRACT

Various embodiments provide a mapping layer to translate DRM system requirements from one DRM system, such as a source system, to another DRM system, such as a target system. In at least some embodiments, DRM system requirement translation is performed using a signed data structure that maps DRM system requirements from one DRM system to one or more other DRM systems. By mapping DRM system requirements from one system to another, licenses associated with DRM-protected content and associated content can be safely transferred between systems.

13 Claims, 5 Drawing Sheets

OTHER PUBLICATIONS

Wegner, "Open DRM Architecture", retrieved at <<http://www.eurescom.de/message/messageSep2003/Open_DRM_archite...>>, pp. 5.

Taban, et al., "Towards a Secure and Interoperable DRM Architecture", Proceedings of the ACM workshop on Digital Rights Management, ACM, 2006, pp. 10.

Jamkhedkar, et al., "Middleware Services for DRM", Jan. 7-12, 2007, 2nd International Conference on Communication Systems Software and Middleware, COMSWARE 2007, pp. 8.

"Extended European Search Report", European Patent Application No. 09759118.4, (Aug. 8, 2011),6 pages.

* cited by examiner

TRANSLATING DRM SYSTEM REQUIREMENTS

BACKGROUND

Digital rights management (DRM) interoperability can be an important issue when DRM-protected content and licenses are moved from one DRM system to another. Specifically, if DRM protections from one system to another are not compatible in terms of the protections they apply, or if DRM system compatibility is unknown, then content and associated licenses may not be able to be easily transferred to and/or consumed by another DRM system. This can be particularly problematic for an individual user who wishes to transfer licenses and content from one of their devices to another.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a mapping layer is provided to translate DRM system requirements from one DRM system, such as a source DRM system, to another DRM system, such as a target DRM system. In at least some embodiments, DRM system requirement translation is performed using a signed data structure that maps DRM system requirements from one DRM system to one or more other DRM systems.

By mapping DRM system requirements from one system to another, licenses associated with DRM-protected content and associated content can be safely transferred between systems.

BRIEF DESCRIPTION OF THE DRAWINGS

The same numbers are used throughout the drawings to reference like features.

DETAILED DESCRIPTION

Overview

In one or more embodiments, a mapping layer is provided to translate DRM system requirements from one DRM system, such as a source DRM system, to another DRM system, such as a target DRM system. In at least some embodiments, DRM system requirement translation is performed using a signed data structure that maps DRM system requirements from one DRM system to one or more other DRM systems.

By mapping DRM system requirements from one system to another, licenses associated with DRM-protected content and associated content can be safely transferred between systems.

In the discussion that follows, a section entitled "Operating Environment" describes but one operating environment that can be utilized to practice the inventive principles described herein in accordance with one or more embodiments. Following this, a section entitled "Example Data Structure" describes an example data structure in accordance with one or more embodiments. Next, a section entitled "Using a Data Structure to Map DRM System Requirements" is provided and describes an example system that can be utilized to map DRM system requirements in accordance with one or more embodiments. Following this, a section entitled "Example Method" describes an example method in accordance with one or more embodiments. Last, a section entitled "Example System" describes an example system that can be utilized to implement one or more embodiments.

Operating Environment

Figure 1:
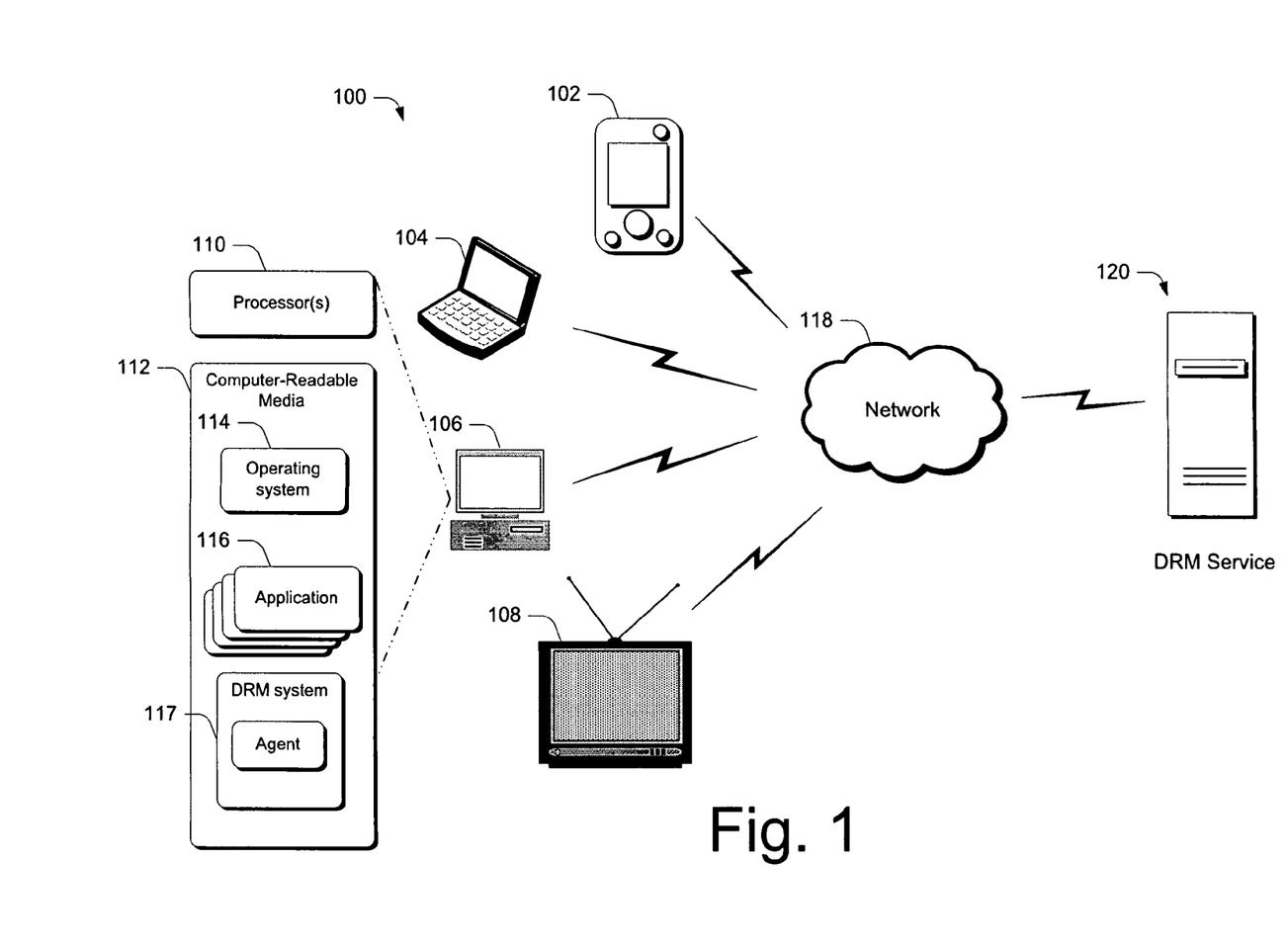
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. Individual computing devices or components associated therewith can typically include one or more processors 110, one or more computer-readable media 112, an operating system 114 and one or more applications 116 that reside on the computer-readable media and which are executable by the processor(s). Such applications can include, by way of example and not limitation, a media playing application or any other type of application that can enable distributed content to be consumed by a user. The computing devices can also include a digital rights management (DRM) system 117 that includes a DRM agent. The DRM agent is typically responsible for enforcing policy that is described in a particular license associated with content that can be received and consumed by the computing device.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet. The network can be utilized to receive DRM-protected content and associated licenses.

Operating environment 100 also includes, in at least some embodiments, an entity that provides a data structure that can be utilized to map DRM system requirements. In this particular example, such entity takes the form of a trusted DRM service or server 120 that can generate and provide a data structure that can be utilized by the various computing devices to translate DRM system requirements from one DRM system to another, as will become apparent below.

The computing devices can be embodied as any suitable computing device such as, by way of example and not limitation, a desktop computer (such as computing device 106), a portable computer (such as computing device 104), a handheld computer such as a personal digital assistant (such as computing device 102), a television that may or may not include a set-top box (such as computing device 108), and the like. One example of a computing device is shown and described below in relation to FIG. 5.

Having discussed the general notion of an example operating environment in which various embodiments can operate, consider now a discussion of how DRM system requirements can be mapped or translated between different DRM systems.

Example Data Structure

Figure 2:
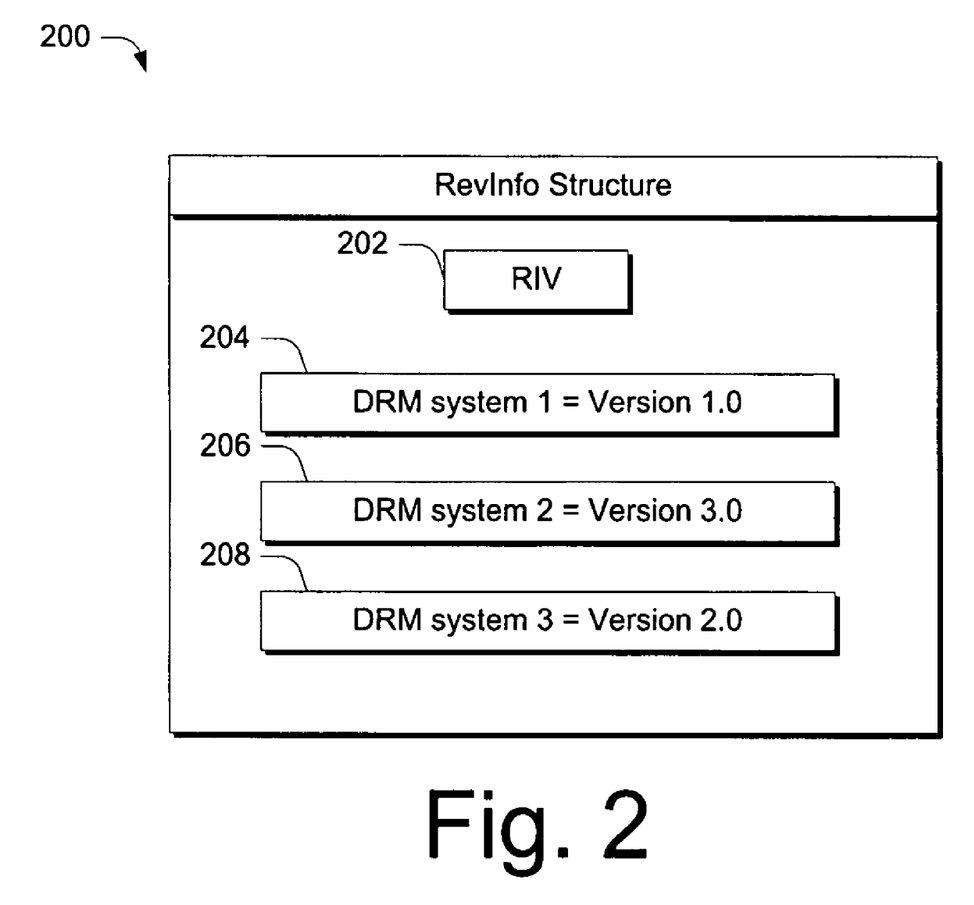
FIG. 2 illustrates an example data structure in accordance with one or more embodiments.

FIG. 2 illustrates an example data structure in accordance with one or more embodiments generally at 200. In the illustrated example, data structure 200 is referred to as a Revocation Information Structure or "RevInfo Structure". Revocation information version refers to a number included in DRM policy that identifies a particular version of revocation data. Revocation data refers to version numbers, certificate revocation lists, system renewability messages or other data utilized to execute revocation, as will be appreciated by the skilled artisan. Data structure 200 includes, in one or more embodiments, a revocation information version 202 and associations between various DRM systems and corresponding system version numbers. For example, in the illustrated example, association 204 defines an association between "DRM system 1" and "Version 1.0", association 206 defines an association between "DRM system 2" and "Version 3.0", and association 208 defines an association between "DRM system 3" and "Version 2.0". So, in the above example, "DRM system 1" might correspond to Microsoft's PlayReady DRM system, "DRM system 2" might correspond to RealNetworks' Helix DRM system and so on.

In this example, for a particular revocation information version number 202, the version numbers described in the associations 204, 206 and 208 are seen to comply with or otherwise satisfy system requirements associated with the revocation information version number. Hence, the structure 200 provides a mapping layer that can translate DRM system requirements from one DRM system to another, such as a DRM system that might be present on a source DRM system and a DRM system that might be present on a target transferee, such as a different target DRM system.

In the illustrated and described embodiment, data structure 200 can be signed and issued to a client computing device by a DRM service, such as DRM service 120 in FIG. 1. Once issued, the client computing device can utilize data structure 200 to ensure that computing devices or target transferees to which DRM-protected content and licenses may be transferred have DRM systems that are compliant with requirements established by the DRM service.

Having considered an example data structure, consider now a discussion of how the data structure can be employed in accordance with one or more embodiments.

Using a Data Structure to Map DRM System Requirements

Figure 3:
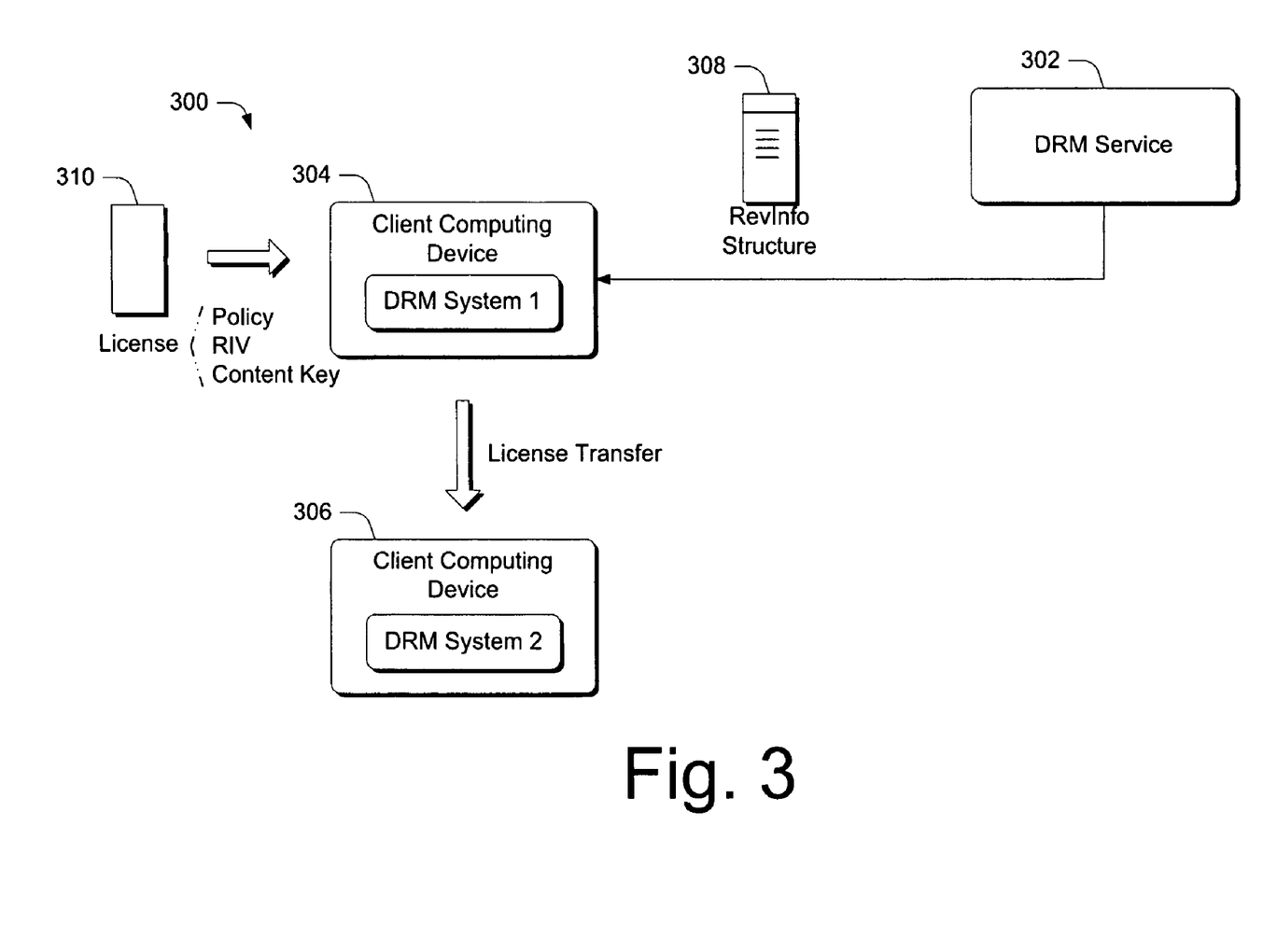
FIG. 3 illustrates a system in accordance with one or more embodiments.

FIG. 3 illustrates a system in accordance with one or more embodiments generally at 300. System 300 includes, in this example, a DRM service 302, a first client computing device 304 having a first DRM system, designated "DRM System 1", and a target transferee in the form of a second client computing device 306 having a second different DRM system, designated "DRM System 2".

In operation, in at least some embodiments, DRM service 302 generates, signs and issues a RevInfo structure 308. Structure 308 includes a RIV number and various associations between DRM systems and system version numbers as described above. In the illustrated and described embodiment, client computing device 304 receives RevInfo structure 308. The RevInfo structure 308 is processed by a DRM agent executing on client computing device 304. Part of this processing can include validating the signature on the RevInfo structure. If the signature validates, then the DRM agent can assume that the various associations described in the RevInfo structure are valid.

Assume now that client computing device 304 receives a license 310 associated with DRM-protected content. In this example, license 310 can include various policies associated with the DRM-protected content, a RIV number for DRM system 1, and a content key. When the DRM agent receives license 310, the DRM agent evaluates the license by ascertaining the license's RIV number and checking the license's RIV number against the RIV number contained in RevInfo structure 308. If the license contains a valid RIV number, and DRM System 1 has a version that is the same as or newer than one described in an association appearing in RevInfo structure 308, client computing device 304 can use the license to consume the associated DRM-protected content.

Assume now that a user of client computing device 304 wishes to transfer the DRM-protected content to client computing device 306. In this case, the DRM agent executing on client computing device 304 queries the DRM system on client computing device 306 to ascertain its version number. If client computing device 306's DRM version number is contained in an association described in RevInfo structure 308 (or, in at least some embodiments, newer than the one described in the RevInfo structure), then the license can be transferred to client computing device 306. If, on the other hand, the DRM version number of the DRM system executing on client device 306 does not match or otherwise favorably compare with a version number described in RevInfo structure 308, the license is not transferred.

In this manner, DRM licenses can be transferred from one system to another in situations where the systems are executing different DRM systems. License transfer is made possible, in this example, through the use of the signed RevInfo structure 308 that was received by client computing device 304.

Having considered an example use of a data structure in accordance with one or more embodiments, consider now a method that can be implemented using the systems described above.

Example Method

Figure 4:
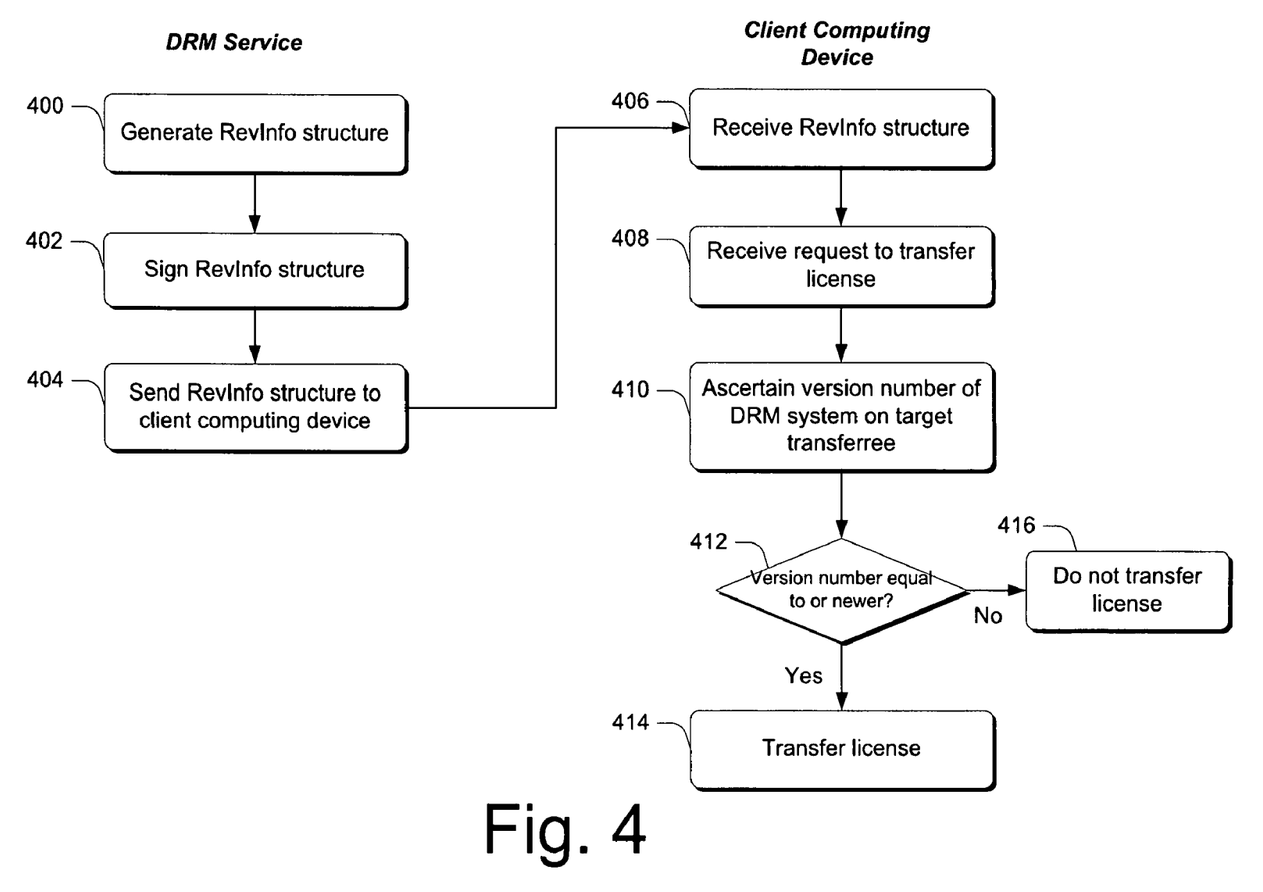
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the method can be implemented by a suitably-configured DRM service. As such, those aspects are designated "DRM Service". Likewise, aspects of the method can be implemented by a suitably-configured client computing device. As such, those aspects are designated "Client Computing Device".

Step 400 generates an RevInfo structure. Examples of a suitable RevInfo structure are provided above. Step 402 signs the RevInfo structure. This step can be accomplished by signing the structure with a private key associated with the DRM service. Step 404 sends the RevInfo structure to a client computing device.

Step 406 receives the RevInfo structure. After receiving the RevInfo structure, the client computing device or, more accurately, a suitably-configured DRM agent executing on the client computing device can verify the authenticity of the RevInfo structure. This can be done, for example, by using a public key associated with the private key that was used to sign the RevInfo structure. Step 408 receives a request to transfer a license associated with DRM-protected content. This step can be performed in any suitable way. For example, a user operating the client computing device may wish to transfer DRM-protected content to another computing device or to another application executing on the current client computing device.

Step 410 ascertains a version number of a DRM system on a target transferee. In the illustrated and described embodiment, a target transferee can include by way of example and not limitation, another computing device or an application executing on the current computing device. Step 412 ascertains whether the version number of the target transferee is equal to or newer than a version number contained in the RevInfo structure. The step can be performed by comparing the version number of the target transferee with a version number contained in an association or mapping described in the RevInfo structure. If the version number of the target transferee is equal to or newer than a version number in the RevInfo structure, then step 414 transfers the license to the target transferee. If, on the other hand, the version number of the target transferee is not equal to or newer than a version number in the RevInfo structure, step 416 does not transfer the license.

Accordingly, licenses can be transferred between systems that employ different DRM systems. In at least some embodiments, the license generated for the target transferee states its version number as mapped using the data structure for the source DRM system. By using mappings that are described in the RevInfo structure, DRM system requirements can be confirmed to meet with requirements promulgated by the DRM service.

Having discussed the notion of translating DRM system requirements from one DRM system to another, consider now a discussion of an example system that can be utilized to implement one or more embodiments.

Example System

Figure 5:
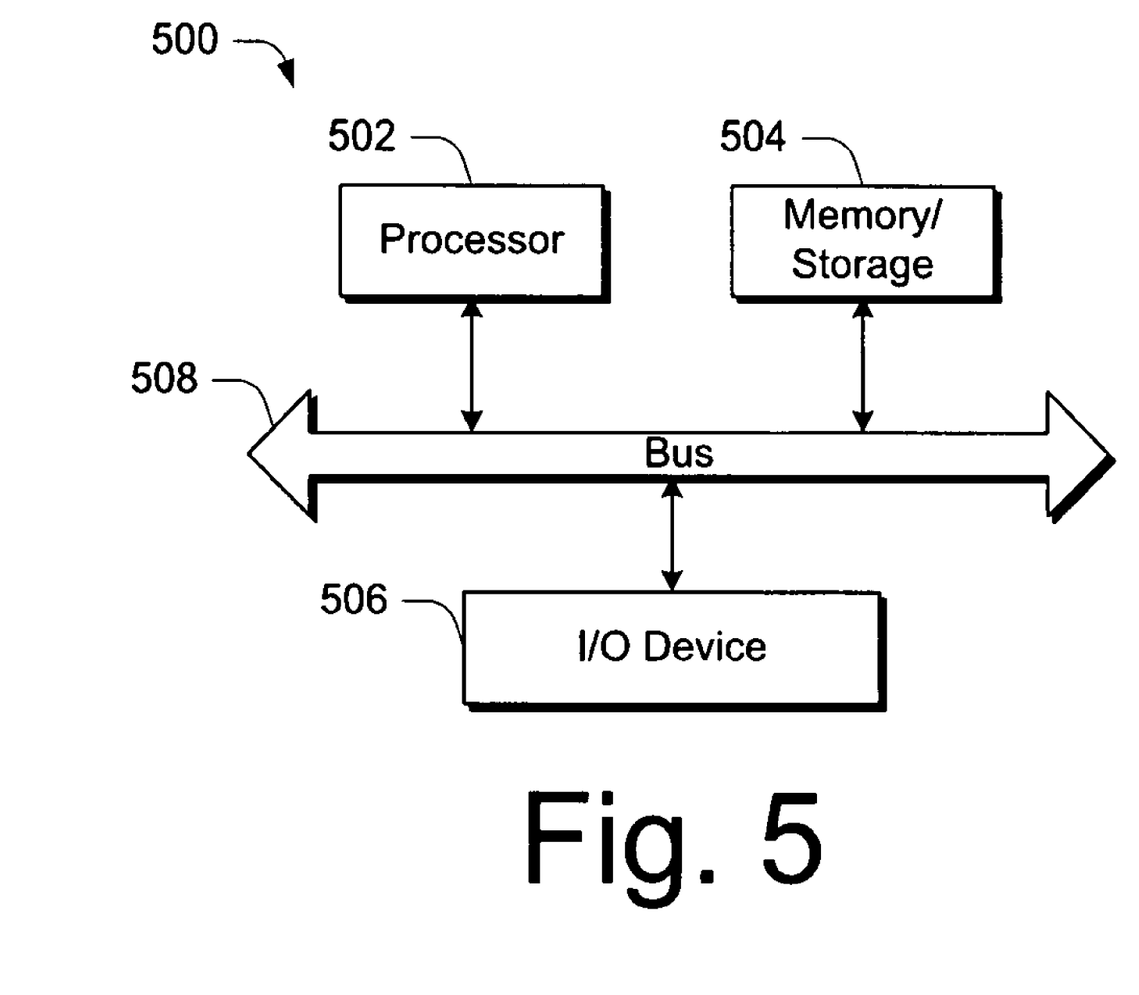
FIG. 5 is a block diagram of an example system that can be utilized to implement one or more embodiments.

FIG. 5 illustrates an example computing device 500 that can implement the various embodiments described above. Computing device 500 can be, for example, various computing devices or servers, such as those illustrated in FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

In one or more embodiments, a mapping layer is provided to translate DRM system requirements from one DRM system, such as a source system, to another DRM system, such as a target system. In at least some embodiments, DRM system requirement translation is performed using a signed data structure that maps DRM system requirements from one DRM system to one or more other DRM systems.

By mapping DRM system requirements from one system to another, licenses associated with DRM-protected content and associated content can be safely transferred between systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
generating a data structure that contains associations between different Digital Rights Management (DRM) systems and corresponding system version numbers, the data structure including a revocation information version number, a DRM system version number contained within an association being in compliance with system requirements associated with the revocation information version number;
signing the data structure; and
sending the signed data structure to a client computing device, wherein the data structure is further configured to enable the client computing device to query at least one other computing device to ascertain DRM system information of the at least one other computing device and transfer at least one license and associated protected content on the client computing device to the at least one other computing device that is determined compliant with DRM requirements.

2. The method of claim 1 wherein said signing is performed by using a private key associated with a trusted DRM service.

3. The method of claim 1, wherein the client computing device and the at least one other computing device are executing different DRM systems.

4. A computer-implemented method comprising:
receiving, at a computing device, a data structure from a Digital Rights Management (DRM) service, the data structure containing:
a revocation information version number; and
associations between different DRM systems and corresponding system version numbers, a corresponding system version number describing a DRM system version being in compliance with system requirements associated with the revocation information version number, wherein the computing device includes a DRM agent configured to query at least one other computing device for DRM system information, wherein the at least one other computing device is a target transferee;

querying, utilizing the DRM agent on the computing device, the target transferee to ascertain a version number of the DRM system on the target transferee;

using, with the computing device, the data structure from the DRM service to transfer a license from the computing device to the target transferee, wherein transferring the license is based, at least in part, on a comparison of the version number associated with the target transferee and a version number contained in an association in the data structure.

5. The method of claim 4 further comprising, prior to said using, receiving, with the computing device, a request to transfer the license, wherein the license is associated with DRM-protected content.

6. The method of claim 4 further comprising after receiving said data structure, verifying, with the computing device, the data structure's authenticity.

7. The method of claim 4 further comprising after receiving said data structure, verifying, with the computing device, the data structure's authenticity using a public key associated with a DRM service from which the data structure was received.

8. The method of claim 4, wherein the computing device is executing a first DRM system, and said target transferee is executing a second different DRM system.

9. The method of claim 4 further comprising:
after said receiving, verifying, with the computing device, the data structure's authenticity; and
receiving, with the computing device, a request to transfer the license, wherein the license is associated with DRM-protected content.

10. The method of claim 4 further comprising:
after said receiving, verifying, with the computing device, the data structure's authenticity; and
receiving, with the computing device, a request to transfer the license, wherein the license is associated with DRM-protected content.

11. The method of claim 10, wherein the computing device is executing a first DRM system, and said target transferee is executing a second different DRM system, and wherein the license for the target transferee includes a version number for the second different DRM system.

12. One or more computer-readable storage media embodying a data structure containing data that can enable licenses to be transferred between systems executing different Digital Rights Management (DRM) systems, wherein the data in the data structure comprises:
a revocation information version number;
a first association between a first DRM system and a first corresponding system version number; and
at least a second association between a second DRM system and a second corresponding system version number,
wherein a system version number described in an association with a DRM system indicates a system version in compliance with system requirements associated with the revocation information version number; and
wherein the data structure is configured to enable a first computing device to query at least one other computing device to ascertain DRM system information of the at least one other computing device and transfer at least one license and associated protected content on the first computing device to the at least one other computing device that is determined compliant with DRM requirements.

13. The one or more computer-readable storage media of claim 12, wherein said data structure comprises a signed data structure.

* * * * *